(12) United States Patent
Sommain

(10) Patent No.: US 7,445,668 B2
(45) Date of Patent: Nov. 4, 2008

(54) HYDRAULIC BINDER HAVING LOW $CO_2$ EMISSION LEVEL

(75) Inventor: Denis Sommain, Culin (FR)

(73) Assignee: VICAT, Paris la Defense Cedex ( * ) Notice: Subject to any disclaimer, the term of this patent is extended or adjusted under 35 U.S.C. 154(b) by 186 days.

(21) Appl. No.: 11/581,292

(22) Filed: Oct. 16, 2006

(65) Prior Publication Data
US 2007/0084383 A1    Apr. 19, 2007

(30) Foreign Application Priority Data
Oct. 17, 2005    (FR) .................................. 05 10573

(51) Int. Cl.
*C04B 7/32*    (2006.01)
*C04B 7/00*    (2006.01)
*C04B 28/02*    (2006.01)
*C04B 28/06*    (2006.01)

(52) U.S. Cl. ........................ 106/695; 106/693; 106/694; 106/705; 106/706; 106/707; 106/709; 106/714; 106/735; 106/739; 106/789; 106/790; 106/819

(58) Field of Classification Search ................ 106/692, 106/693, 694, 695, 705, 706, 707, 709, 789, 106/790, 714, 735, 739, 819
See application file for complete search history.

(56) References Cited

U.S. PATENT DOCUMENTS

| | | | | | |
|---|---|---|---|---|---|
| 4,036,657 | A | * | 7/1977 | Mehta | 106/757 |
| 4,319,927 | A | * | 3/1982 | Segal | 106/717 |
| 4,508,573 | A | * | 4/1985 | Harris | 106/752 |
| 4,600,438 | A | * | 7/1986 | Harris | 106/757 |
| 4,957,556 | A | * | 9/1990 | Kunbargi | 106/693 |
| 5,356,472 | A | * | 10/1994 | Odler | 106/734 |
| 5,851,282 | A | * | 12/1998 | Odler | 106/733 |
| 5,891,239 | A | * | 4/1999 | Costa | 106/735 |
| 6,602,343 | B1 | * | 8/2003 | Costa et al. | 106/692 |
| 6,641,658 | B1 | | 11/2003 | Dubey | |
| 6,695,910 | B2 | * | 2/2004 | Classen et al. | 106/739 |
| 6,730,162 | B1 | * | 5/2004 | Li et al. | 106/772 |
| 6,758,896 | B2 | * | 7/2004 | Kunbargi | 106/692 |
| 2004/0040474 | A1 | | 3/2004 | Perez-Pena et al. | |

FOREIGN PATENT DOCUMENTS

FR    2694552    2/1994
WO    WO94/03407 A  *  2/1994

OTHER PUBLICATIONS

European Search Report dated Jul. 3, 2006.

* cited by examiner

*Primary Examiner*—Anthony J Green
(74) *Attorney, Agent, or Firm*—Hamre, Schumann, Mueller & Larson, P.C.

(57) ABSTRACT

The invention relates to a hydraulic binder containing, in percentage by weight:
- from 1.1 to 9% of tricalcium aluminate
- from 1.5 to 13.5% of tetracalcium ferroaluminate
- from 0.5 to 1.5% of dodecacalcium heptaaluminate
- from 0.5 to 1.5% of tetracalcium trialuminate sulphate
- from 0 to 0.8% of dicalcium silicoaluminate
- from 5 to 70% of pozzolanic material(s)
- from 0 to 6% of calcium sulphate the remainder being composed of the non-aluminous constituents of at least one Portland-type clinker.

It also relates to concretes or mortars prepared using a binder of this type.

13 Claims, No Drawings

HYDRAULIC BINDER HAVING LOW CO₂ EMISSION LEVEL

The invention relates to the field of hydraulic binders.

More specifically, it relates to new compositions of hydraulic binders having notable mechanical properties, in particular an adjustable setting time and high strength from the first few hours, and which can be prepared with notable respect for the environment, in particular owing to the low levels of carbon dioxide emission during the development of said binders.

It is well known that the cement industry consumes large amounts of energy.

Moreover, owing to the reactions carried out and the processes used, this industry generates carbon dioxide which contributes to atmospheric pollution.

This carbon dioxide results both from the burning carried out in order to bake the raw material required for the development of the cement and from the chemical reactions which take place during this baking stage, in particular from the reaction in removing the carbonates which always form a large part of this raw material.

In view of these two sources for the emission of carbon dioxide in the cement industry, various methods have been used for a number of years in order to attempt to reduce this pollution.

These involve either using substitute fuels which enable carbon dioxide emissions to be limited or modifying the nature of the raw material used to develop the cement in order to limit carbon dioxide emissions when this raw material is baked.

The inventor of the present invention have worked within the second method by carrying out systematic tests intended to develop compositions of hydraulic binders having a low $CO_2$ emission level.

It is known that one of the methods for modifying the composition of a cement in order to reduce $CO_2$ emissions is to use slag originating from blast furnaces, fly ash from electric power stations or natural or synthetic pozzolans in order to reduce the amount of clinker required for preparing the cement and, accordingly, to reduce $CO_2$ emissions.

However, it is well known that these various uses generally impair mechanical strength at young ages (prior to 7 days).

International application WO 94/03407 describes rapid-setting and hardening hydraulic binders, and binder mixtures containing said binders. This application describes, more specifically, hydraulic binders containing from 50 to 99% by weight of a natural cement resulting from calcination at a temperature of from 900 to 1,200° C. of a single raw material containing sulphurated argillaceous phases and calcium carbonate in an intimate mixing relationship and from 1 to 50% of a pozzolanic product. This same application also describes mixtures of these binders with Portland-type cements.

The inventor of the present invention realised that by systematically producing numerous mixtures prepared, in particular, from natural cements having highly determined mineralogical compositions with Portland-type cements enriched with pozzolanic materials, it was possible to achieve compositions of hydraulic binders having a low $CO_2$ emission level and having notable mechanical properties and rapid setting properties despite their very high content of pozzolanic-type materials. On the basis of these systematic tests, he was able to optimize the composition of the binders in order to obtain binders having low shrinkage, adjustable setting times, in particular rapid setting times, and high mechanical strength from the first few hours, with optimum respect for the environment by limiting releases of $CO_2$ and the energy required for baking the raw material.

It should be noted that throughout the present document all references to the release of $CO_2$ refer to release associated with decarbonation and that this emission of $CO_2$ associated with decarbonation results from a calculation.

This calculation is carried out on the basis of the initial chemical composition of the raw material used for developing the cement (also referred to as the raw mix). On the basis of the chemical composition of the raw mix expressed in oxides (basically CaO and MgO), the carbonate content is calculated and, from this calculation, the corresponding mass of $CO_2$ which is added to each tonne of clinker is determined.

Definitions will be provided hereinafter of terms which will be used in the present document and which are generally in accordance with European Standard EN197-1:

The term "hydraulic binder" refers, in the sense of the invention, to an inorganic material which, when mixed with water, forms a paste which sets and hardens owing to a series of reactions and hydration processes and which preserves its strength and its stability, even under water after hardening.

The term "common cement (CEM)" refers to hydraulic binders, the hydraulic hardening of which is due mainly to hydration of calcium silicates. Other chemical compounds, such as aluminates, participate in this hardening process.

All of the chemical compounds contained in a CEM cement form, after baking at around 1,450° C., what is known as clinker.

The cements differ from one another in terms of their properties and their performance levels.

Reference will be made in the present document to performance tests as defined in European Standard EN197-1. This standard defines and presents the specifications of 27 cements, known as common cements, the compositions of which are indicated in Table I, which appears at the end of the description.

The term "natural cement" refers to a cement resulting from the heat treatment of a single raw material, in contrast to an artificial, Portland-type cement.

The term "natural quick-setting cement" refers to a rapid-setting and hardening cement resulting from the baking at a moderate temperature of an argillaceous limestone of uniform composition, extracted from homogeneous banks and ground very finely. This cement is defined by Standard NFP 15-314.

A cement of this type is characterized by the presence of calcium silicate, basically in the form of active bicalcium silicate, calcium-rich calcium aluminate and calcium sulphoaluminate.

The term "clinker" refers to the product obtained by calcination of the treated inorganic material.

The term "Portland clinker" refers to the product, as defined in Standard EN 197-1, obtained by calcination of a precisely fixed mixture of raw materials containing elements commonly expressed in oxides (CaO, $SiO_2$, $Al_2O_3$, $Fe_2O_3$) and small amounts of other materials.

The term "pozzolanic material" refers to natural siliceous or silicoaluminous substances or a combination thereof, but also fly ashes, silica fumes and materials having pozzolanic properties, in particular slag-type materials.

The hydraulic binders are used with sand in order to obtain mortars.

The hydraulic binders are used with sand and gravel in order to obtain concretes.

According to one of its basic features, the invention relates to a hydraulic binder containing, in percentage by weight:

from 1.1 to 9% of tricalcium aluminate
from 1.5 to 13.5% of tetracalcium ferroaluminate
from 0.5 to 1.5% of dodecacalcium heptaaluminate
from 0.5 to 1.5% of tetracalcium trialuminate sulphate
from 0 to 0.8% of dicalcium silicoaluminate
from 5 to 70% of pozzolanic material(s)
from 0 to 6% of calcium sulphate
the remainder being composed of the non-aluminous constituents of at least one Portland-type clinker.

As stated hereinbefore, the development of a hydraulic binder matching the foregoing composition has resulted from systematic tests carried out by the inventor in order to obtain a hydraulic binder composition having durability properties characterized by low hydration heat and low drying shrinkage and application properties characterized by adjustable setting times and strength from the first few hours which render these compositions comparable to CEM I-type cements, with, moreover, much lower $CO_2$ emissions and energy expenditure, as emerges from the tables set out in the "Examples" section.

It will be noted that in the composition provided hereinbefore, the various mineralogical phases are indicated by the chemical constituents thereof.

The following Table II indicates, for various chemical constituents of the binder compositions and, in particular, those cited hereinbefore, the chemical identity thereof, the chemical formula thereof, the nomenclature of the corresponding mineralogical phase and the nomenclature conventionally used by cement manufacturers.

TABLE II

| Tricalcium silicate | $3CaO \cdot SiO_2$ | Alite | $C_3S$ |
|---|---|---|---|
| Dicalcium silicate | $2CaO \cdot SiO_2$ | Belite | $C_2S$ |
| Tricalcium aluminate | $3CaO \cdot Al_2O_3$ | Celite | $C_3A$ |
| Tetracalcium ferroaluminate | $4CaO(Al_2O_3 \cdot Fe_2O_3)$ | Ferrite | $C_4AF$ |
| Tetracalcium trialuminate sulphate | $4CaO \cdot 3Al_2O_3 \cdot SO_3$ | Yeelimite | $C_4A\overline{S}$ |
| Dodecacalcium heptaaluminate | $12CaO \cdot 7Al_2O_3$ | Mayenite | $C_{12}A7$ |
| Dicalcium silicoaluminate | $2CaO \cdot Al_2O_3 \cdot SiO_2$ | Gehlenite | $C_2AS$ |

The pozzolanic material(s) of the compositions of the invention is/are selected from the group consisting of natural pozzolans, calcined natural pozzolans, siliceous fly ashes, calcium fly ashes, silica fumes and slags, in particular blast-furnace slags, and mixtures thereof.

These are pozzolanic materials which are conventionally used in the cement industry and which are conventionally found in the common cements, the compositions of which are indicated in Table I.

According to an advantageous embodiment of the invention, the weight proportion of the pozzolanic material(s) is between 20 and 70% by weight.

The tests carried out by the inventor of the present invention have revealed that, according to a particularly advantageous variation, the binder was obtained by mixing of a natural cement, at least one CEM II, CEM III, CEM IV or CEM V-type common cement and pozzolanic material(s).

It has also become apparent that the binders of the invention are advantageously obtained from mixing at least one natural cement with at least one Portland-type cement and at least one pozzolanic material in proportions such that the natural cement represents from 20 to 50% by weight of said mixture and that the Portland-type clinker introduced by said Portland-type cement or cements represents from 6 to 59% by weight of said mixture.

This natural cement is advantageously a belite-type cement activated by aluminates.

Furthermore, the setting properties are improved as a result of the fact that the aluminates contained in the composition were baked at different temperatures. A result of this type is obtained, in particular, if the natural cement is baked at a temperature which varies over a broad range, in particular a range of between 500 and 1,300° C.

It also became apparent in the systematic tests carried out by the inventor of the present invention that the qualities of the cement of the invention are broadly associated with the reactivity of the aluminates contained in the composition.

That is to say, the longer these aluminates are baked at a low temperature, the more reactive they are during the hydration thereof, owing to the fact that either they are formed of very small crystals or they are poorly crystallized. Ideally, in order to obtain maximum reactivity of the various aluminates of the composition, they would have to be baked in isolation, each at its minimum formation temperature, and then mixed.

Obviously, a preparation process of this type is not realistic.

This is why use is preferably made of natural cements which are baked under conditions such that their baking temperature varies from 500 to 1,300° C., thus covering all of the optimum temperature ranges of these aluminates.

Such a temperature range provides, for each of the four reactive aluminates present in the composition of the invention, a fraction which will be baked at its optimum reaction temperature.

Moreover, the natural cement advantageously contains aluminates each having at least one fraction baked at a temperature known as the "optimum reactivity temperature".

The term "optimum reactivity temperature" refers, in the sense of the invention, to the temperature at which are formed the inorganic phases which will have the most rapid hydration kinetics and will therefore cause rapid setting and hardening. It is different from (lower than) the temperature which will provide the maximum formation yield of the inorganic material.

In addition to these aluminates, each baked at an optimum temperature, the composition advantageously contains from 40 to 70% of belite, from 5 to 17% of alite and from 0 to 15% of calcium carbonate, these various proportions being expressed in percentage by weight.

According to a particularly advantageous embodiment of the invention, the compositions are obtained using, as the natural cement, natural quick-setting cement, which is a rapid-setting and hardening cement resulting exclusively from the baking at a moderate temperature (from 1,000 to 1,200° C.) of an argillaceous limestone of uniform composition, extracted from homogeneous banks, then ground very finely.

It is composed mainly of calcium silicate, aluminate and sulphoaluminate, as well as small amounts of lime, magnesia, potassium and calcium sulphates and traces of other elements.

As stated hereinbefore, the compositions of the invention may be obtained by mixing at least one natural cement, in particular natural quick-setting cement, with a Portland-type clinker and at least one pozzolanic-type material and optionally with calcium sulphate.

Compositions of this type will advantageously comprise, by weight:

from 20 to 50% by weight of natural cement from 0 to 6% of calcium sulphate from 6 to 63% of Portland-type clinker from 5 to 70% of pozzolanic material(s)

The Portland-type clinkers contained in these compositions can advantageously be introduced simultaneously with a portion of the pozzolanic material(s) by way of cements classed as CEM II, CEM III, CEM IV or CEM V.

Use may be made, in particular, of a CEM III/B-type cement comprising, by weight, from 20 to 34% of clinker and from 60 to 80% of slag.

Use may also be made of a CEM III (A, B or C) cement, cements of this type containing, by weight, from 5 to 64% of clinker and from 95 to 36% of slag.

Use may also be made of CEM II-type cements or CEM V-type blended cements or CEM IV-type pozzolanic cements comprising from 20 to 80% by weight of clinker and also pozzolanic components such as slags, silica fumes, natural pozzolan, artificial pozzolan, siliceous fly ashes, calcium fly ashes and/or calcined shale in proportions of between 80 and 20%.

A preferred composition of the invention will thus contain, by weight:

from 20 to 50% of natural cement, in particular natural quick-setting cement from 0 to 6% of calcium sulphate from 8 to 47% of Portland-type clinker from 20 to 70% of pozzolanic material, this pozzolanic material advantageously originating, at least in part, from a CEM III (A, B or C)-type cement.

As indicated hereinbefore, the advantage of all of these above-described compositions is that they can be prepared with particularly low decarbonation-associated $CO_2$ emissions, in particular emissions of between 200 and 250 kg/t, whereas these emissions are from approximately 470 to 500 kg/t for a CEM I-type common cement.

It will be noted that the figures cited hereinbefore relate solely to $CO_2$ emissions originating from decarbonation; $CO_2$ emissions originating from the burning of fuels have not been taken into account, since they vary as a function of the fuel quality (especially for CEMs).

A further advantage of these compositions is that they can be prepared while consuming particularly small amounts of energy. Thanks to the invention, these amounts of energy may be lowered of at least 50%, compared with a conventional CEM I-type cement.

A still further advantage of these compositions is that they have a particularly low hydration heat of approximately 200 J/g, whereas a CEM I-type cement generally has a hydration heat of approximately 400 J/g.

A further advantage of the compositions of the invention is that they result in cements having lower drying shrinkage, generally of approximately 500 μm/m, whereas CEM cements generally have shrinkage of from approximately 800 to 1,000 μm/m.

These binders have proven to be particularly beneficial owing to their adjustable setting times of from 30 min to 3 h and to the strength thereof from the first hour or hours. It will be noted in this regard that Standard EN 197-1 specifies as the time required for setting to commence:

for Class 32.5, at least 75 minutes for Class 42.5, at least 60 minutes and for Class 52.5, at least 45 minutes.

Owing to all of these advantages, the binders of the invention will be used for preparing various compositions based on hydraulic binders, in particular mortars and concretes, in particular in all applications in which there are sought hydraulic binders not requiring a workability time of greater than two hours.

It will be recalled that the workability or handiness of a concrete refers to the time for which the concrete must preserve its plasticity in order to be laid correctly. This workability or handiness may be defined as the ease of operation of the concrete for optimum filling of the formwork or the reinforcement. This workability determines the compactness and the actual strength of the concrete in the structure itself, covering of and adherence to fittings, the cohesion of the concrete (which reduces the risk of segregation), the attractiveness of the facing, the degree of tightness, etc. This period must be sufficiently long to allow the concrete to be conveyed and poured. The workability may be monitored, in particular, using "Abrams cone slump"-type tests in accordance with Standard NF P 18 451.

The invention thus also relates, according to one of its basic characteristics, to concretes and mortars containing the above-described hydraulic binders of the invention.

The following examples are provided purely to illustrate the invention.

EXAMPLES

Two compositions of hydraulic binders according to the invention, which will be denoted as A and B, were prepared by mixing a natural cement with a common cement and a pozzolanic material.

These compositions are indicated in the following Table III:

TABLE III

|  | A | B |
|---|---|---|
| C3A | 3.2% | 3.7% |
| C4AF | 4.9% | 5.9% |
| C12A7 | 1% | 1.4% |
| C4A3S | 1% | 1.4% |
| C2A4 | 0.5% | 0.7% |
| C2S | 23.5% | 30% |
| C3S | 10% | 11.8% |
| CaCO3 | 5% | 7% |
| Calcium sulphate | 5.2% | 6% |
| Slag | 37% | 25.2% |
| Silica fumes | 6% | 8% |

These compositions were compared with a CEM I 52.5-type control cement, denoted hereinafter as T.

Tables IV, V, VI and VII indicate respectively, for compositions A and B of the invention and also for the control T:

Table IV: the energy balance and the $CO_2$ emissions

Table V: the hydration heat measured on mortar to Standard NFP15-436 and the drying shrinkage after 28 days for mortars in which the cement/sand ratio is 1:3 and the water/cement ratio 0.5

Tables VI and VII: various mechanical properties (workability, compressive strength, shrinkage, maximum temperature of the concrete), respectively for two types of concrete added-self-compacting concrete and precast prestressed concrete - the proportions of which are indicated in the first two lines of each table, each of these concretes also containing a conventional additive (polycarboxylate-type superplasticizer, trisodium citrate-type retarder and lithium carbonate and sodium carbonate-type accelerators).

In concretes known as "mass concretes", which are intended to be applied in high thicknesses, it is known that the heat released by hydration of the concrete will be greater on the interior than at the surface owing to the losses at the surface on contact with air. The expansion of the concrete is followed by a contraction phase as the concrete cools. As the amplitudes are dependent on the thickness, differing tensile stresses will appear, and this may lead to cracking. A lower rise in temperature of the concrete is therefore evidence of durability.

This is why the indication of the temperature known as the "maximum temperature", measured in the present case in cylindrical moulds having a diameter of 16 cm and a height of 32 cm in an almost adiabatic condition, provides a reliable indication of the durability of the concrete.

TABLE IV

|   | Energy balance (kJ/kg cement) | $CO_2$ emission (kg/tonne of cement) |
|---|---|---|
| T | 2,939 | 480 |
| A | 1,114 | 215 |
| B | 1,470 | 245 |

TABLE V

|   | Hydration heat (J/g) | Drying shrinkage after 28 days (µm/m) |
|---|---|---|
| T | 400 | 800 |
| A | 259 | 500 |
| B | 260 | 500 |

TABLE VI

| | Self-compacting concrete | | |
|---|---|---|---|
| | T | A | B |
| Proportions | 320 kg/m³ | 320 kg/m³ | 320 kg/m³ |
| Water/cement | 0.62 | 0.53 | 0.53 |
| Workability time | 2 h | 2 h | 2 h |
| Compressive strength 3 h | 0 MPa | 3 MPa | 7 MPa |
| Compressive strength 24 h | 11 MPa | 7 MPa | 11 MPa |
| Compressive strength 7 days | 31 MPa | 12 MPa | 18.2 MPa |
| Compressive strength 28 days | 38.8 MPa | 19 MPa | 39.3 MPa |
| Compressive strength 91 days | 42.8 MPa | 50 MPa | 50 MPa |

TABLE VI-continued

| | Self-compacting concrete | | |
|---|---|---|---|
| | T | A | B |
| Shrinkage 28 days | 378 µm/m | 193 µm/m | 240 µm/m |
| Maximum concrete T | 35° C. | 30° C. | 31° C. |

TABLE VII

| | Precast prestressed concrete | | |
|---|---|---|---|
| | T | A | B |
| Proportions | 405 kg/m³ | 405 kg/m³ | 405 kg/m³ |
| Water/cement | 0.38 | 0.3 | 0.3 |
| Workability time | >30 min | >30 min | >30 min |
| Compressive strength 3 h | 0 MPa | 15 MPa | 25 MPa |
| Compressive strength 15 h | 33 MPa | 21 MPa | 34 MPa |
| Compressive strength 24 h | 45 MPa | 30 MPa | 42 MPa |
| Compressive strength 7 days | 57 MPa | 40 MPa | 52.9 MPa |
| Compressive strength 28 days | 62 MPa | 63 MPa | 63.5 MPa |
| Shrinkage 28 days | 449 µm/m | 283 µm/m | 246 µm/m |
| Maximum concrete T | 46° C. | 31° C. | 33° C. |

The various tables, Tables IV, V, VI and VII, clearly show that $CO_2$ emission is much lower with a composition of the invention than with the control cement and that the same is true of the energy balance.

Moreover, Tables VI and VII show that the compressive strength properties are quite comparable to those obtained with a concrete prepared from a CEM I-type control cement.

It will also be noted from these two tables that the compressive strength properties are quite comparable to those obtained with concrete prepared from a CEM I-type control cement and that both the drying shrinkage and the maximum temperature of the concretes of the invention are lower than those of the control concrete.

It is therefore entirely conceivable for the compositions of the invention to have applications similar to those of the CEM I-type cements while at the same time providing a significant reduction in $CO_2$ emissions, a much lower thermal balance and much less hydration heat with shrinkage also being reduced.

TABLE I

The 27 products of the family of French cements

| | | | Composition (percentage by mass) a) Principal constituents | | | | | |
|---|---|---|---|---|---|---|---|---|
| | | | | | | Pozzolans | | |
| Principal types | Notation of the 27 products (types of common cement) | | Clinker K | Blast-furnace slag S | Silica fumes D b) | Natural P | Calcined natural Q | Fly ashes Siliceous V |
| CEM I | Portland cement | CEM-I | 95-100 | — | — | — | — | — |
| CEM II | Slag Portland cement | CEM II/A-S | 80-94 | 6-20 | — | — | — | — |
| | | CEM II/B-S | 65-79 | 21-35 | — | — | — | — |
| | Silica fume Portland cement | CEM II/A-D | 90-94 | — | 6-10 | — | — | — |
| | Pozzolan Portland | CEM II/A-P | 80-94 | — | — | 6-20 | — | — |

TABLE I-continued

The 27 products of the family of French cements

|  |  |  |  |  |  |  |  |  |
|---|---|---|---|---|---|---|---|---|
|  | cement | CEM II/B-P | 65-79 | — | — | 21-35 | — | — |
|  |  | CEM II/A-Q | 80-94 | — | — | — | 6-20 | — |
|  |  | CEM II/B-Q | 65-79 | — | — | — | 21-35 | — |
|  | Fly ash Portland | CEM II/A-V | 80-94 | — | — | — | — | 6-20 |
|  | cement | CEM II/B-V | 65-79 | — | — | — | — | 21-35 |
|  |  | CEM II/A-W | 80-94 | — | — | — | — | — |
|  |  | CEM II/B-W | 65-79 | — | — | — | — | — |
|  | Calcined shale | CEM II/A-T | 80-94 | — | — | — | — | — |
|  | Portland cement | CEM II/B-T | 65-79 | — | — | — | — | — |
|  | Limestone Portland | CEM II/A-L | 80-94 | — | — | — | — | — |
|  | cement | CEM II/B-L | 65-79 | — | — | — | — | — |
|  |  | CEM II/A-LL | 80-94 | — | — | — | — | — |
|  |  | CEM II/B-LL | 65-79 | — | — | — | — | — |
|  | Blended Portland | CEM II/A-M | 80-94 | ← 6-20 → | | | | |
|  | cement c) | CEM II/B-M | 65-79 | ← 21-35 → | | | | |
| CEM III | Blast-furnace cement | CEM III/A | 35-64 | 36-65 | — | — | — | — |
|  |  | CEM III/B | 20-34 | 66-80 | — | — | — | — |
|  |  | CEM III/C | 5-19 | 81-95 | — | — | — | — |
| CEM IV | Pozzolanic cement c) | CEM IV/A | 65-89 | — | ← 11-35 → | | | |
|  |  | CEM IV/B | 45-64 | — | ← 11-35 → | | | |
| CEM V | Cement and | CEM V/A | 40-34 | 18-30 | — | ← 18-30 → | | |
|  | compound c) | CEM V/B | 20-38 | 31-50 | — | ← 31-50 → | | |

| Principal types | | Notation of the 27 products (types of common cement) | Composition (percentage by mass) a) Principal constituents | | | | Secondary constituents |
|---|---|---|---|---|---|---|---|
| | | | Fly ashes Calcium W | Calcined shale T | Limestone L | LL | |
| CEM I | Portland cement | CEM-I | — | — | — | — | 0-5 |
| CEM II | Slag Portland | CEM II/A-S | — | — | — | — | 0-5 |
|  | cement | CEM II/B-S | — | — | — | — | 0-5 |
|  | Silica fume Portland cement | CEM II/A-D | — | — | — | — | 0-5 |
|  | Pozzolan Portland | CEM II/A-P | — | — | — | — | 0-5 |
|  | cement | CEM II/B-P | — | — | — | — | 0-5 |
|  |  | CEM II/A-Q | — | — | — | — | 0-5 |
|  |  | CEM II/B-Q | — | — | — | — | 0-5 |
|  | Fly ash Portland | CEM II/A-V | — | — | — | — | 0-5 |
|  | cement | CEM II/B-V | — | — | — | — | 0-5 |
|  |  | CEM II/A-W | 6-20 | — | — | — | 0-5 |
|  |  | CEM II/B-W | 21-35 | — | — | — | 0-5 |
|  | Calcined shale | CEM II/A-T | — | 6-20 | — | — | 0-5 |
|  | Portland cement | CEM II/B-T | — | 21-35 | — | — | 0-5 |
|  | Limestone Portland | CEM II/A-L | — | — | 6-20 | — | 0-5 |
|  | cement | CEM II/B-L | — | — | 21-35 | — | 0-5 |
|  |  | CEM II/A-LL | — | — | — | 6-20 | 0-5 |
|  |  | CEM II/B-LL | — | — | — | 21-35 | 0-5 |
|  | Blended Portland | CEM II/A-M | ← 6-20 → | | | | 0-5 |
|  | cement c) | CEM II/B-M | ← 21-35 → | | | | 0-5 |
| CEM III | Blast-furnace cement | CEM III/A | — | — | — | — | 0-5 |
|  |  | CEM III/B | — | — | — | — | 0-5 |
|  |  | CEM III/C | — | — | — | — | 0-5 |
| CEM IV | Pozzolanic cement c) | CEM IV/A | 11-35 | — | — | — | 0-5 |
|  |  | CEM IV/B | 11-35 | — | — | — | 0-5 |
| CEM V | Cement and | CEM V/A | — | — | — | — | 0-5 |
|  | compound c) | CEM V/B | — | — | — | — | 0-5 | a) The indicated values refer to the sum of the principal and secondary constituents
b) The proportion of silica fumes is limited to 10%
c) In the case of CEM II/A-M and CEM II/B-M blended Portland cements, CEM IV/A and CEM IV/B pozzolanic cements and CEM V/A and CEM V/B blended cements, the principal constituents, other than clinker, must be declared in the designation of the cement

What is claimed:

1. A hydraulic binder containing in percentage by weight:
from 1.1 to 9% of tricalcium aluminate
from 1.5 to 13.5% of tetracalcium ferroaluminate
from 0.5 to 1.5% of dodecacalcium heptaaluminate
from 0.5 to 1.5% of tetracalcium trialuminate sulphate
from 0 to 0.8% of dicalcium silicoaluminate
from 5 to 70% of pozzolanic material(s)
from 0 to 6% of calcium sulphate
the remainder being composed of non aluminous constituents of at least one Portland clinker.

2. The hydraulic binder according to claim 1, wherein the pozzolanic material(s) is/are selected from the group consisting of natural pozzolans, calcined natural pozzolans, siliceous fly ashes, calcium fly ashes, silica flames and slags.

3. The hydraulic binder according to claim 1, containing from 20 to 70% by weight of pozzolanic material(s).

4. The hydraulic binder according to claim 1, obtained by mixing of a natural cement, at least one CEM II, CEM III, CEM IV or CEM V-type common cement and pozzolanic material(s).

5. The hydraulic binder according to claim 1, resulting from the mixing of at least one natural cement with at least one Portland cement and at least one pozzolanic material in proportions such that the natural cement represents from 20 to 50% by weight of said mixture and that the Portland clinker introduced by said Portland cement or cements represents from 6 to 59% by weight of said hydraulic binder.

6. The hydraulic binder according to claim 4, wherein said natural cement is a belite cement activated by aluminates.

7. The hydraulic binder according to claim 1, comprising aluminates baked at different temperatures.

8. The hydraulic binder according to claim 1, containing a natural cement obtained after baking at a temperature in a range from 500 to 1,300° C.

9. The hydraulic binder according to claim 1, containing a natural cement having a baking temperature which is in a range from 500 to 1,300° C., so that each of the aluminates contained in said natural cement have at least one fraction baked at an optimum reactivity temperature and further comprising:
from 40 to 70% of belite (C2S),
from 5 to 7% of alite (C3S), and
from 0 to 15% of calcium carbonate,
the various proportions being expressed by weight.

10. The hydraulic binder according to claim 1, containing from 20 to 50% by weight of natural quick-setting cement.

11. The hydraulic binder according to claim 1, containing:
from 20 to 50% by weight of natural cement,
from 0 to 6% of calcium sulphate
from 8 to 47% of Portland clinker
from 20 to 70% of pozzolanic material(s).

12. The hydraulic binder of claim 11 wherein said natural cement is natural quick-setting cement.

13. Concretes or mortars, based on a hydraulic binder, wherein said hydraulic binder is a hydraulic binder as defined in claim 1.

* * * * *